United States Patent [19]

McGrew

[11] Patent Number: 5,396,559
[45] Date of Patent: Mar. 7, 1995

[54] ANTICOUNTERFEITING METHOD AND DEVICE UTILIZING HOLOGRAMS AND PSEUDORANDOM DOT PATTERNS

[76] Inventor: Stephen P. McGrew, 149-B Josephine St., Santa Cruz, Calif. 95060

[21] Appl. No.: 574,647

[22] Filed: Aug. 24, 1990

[51] Int. Cl.$^6$ .............................................. G09C 5/00
[52] U.S. Cl. .......................................... 380/54; 380/6; 380/9; 380/23; 380/59; 283/17; 283/73; 283/86; 283/93
[58] Field of Search ................. 380/6, 7, 9, 10, 23–25, 380/54, 59; 283/17, 73–78, 81, 86, 93

[56] References Cited

U.S. PATENT DOCUMENTS

| | | | |
|---|---|---|---|
| 3,772,200 | 11/1973 | Livesay | 283/74 X |
| 3,829,661 | 8/1974 | Silverman et al. | 283/73 X |
| 3,894,756 | 7/1975 | Ward | 283/75 X |
| 3,914,877 | 10/1975 | Hines | 380/54 |
| 4,126,373 | 11/1978 | Moraw | 283/75 X |
| 4,269,473 | 5/1981 | Flothmann et al. | 283/86 X |
| 4,400,616 | 8/1983 | Chevillat et al. | 283/75 X |
| 4,586,711 | 5/1986 | Winters et al. | 380/54 X |

*Primary Examiner*—Bernarr E. Gregory
*Attorney, Agent, or Firm*—Wells, St. John, Roberts, Gregory & Matkin

[57] ABSTRACT

A security device for use on identification cards, monetary documents, and the like using a reference pattern and a message pattern each having the appearance of a random pattern of dots. The reference pattern is a dense pattern of randomly positioned dots, and the message pattern is a modulated version of the reference pattern in which the dots of the reference pattern are slightly repositioned by an amount depending on the grey value or color value of a message image at each dot location. The message image is decrypted and becomes visible with a range of grey values when it is viewed through a film transparency of the reference pattern. The dot pattern may be printed, embossed or recorded as a photograph or a hologram. Decryption of the message image may be accomplished by viewing through a contact mask, superposition of images of the message pattern and reference pattern, by viewing the message pattern through a mask positioned at a real image of the reference pattern, or like means.

3 Claims, 10 Drawing Sheets

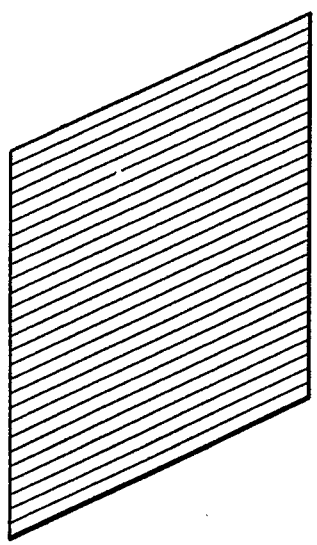
Fig 1A
PRIOR ART
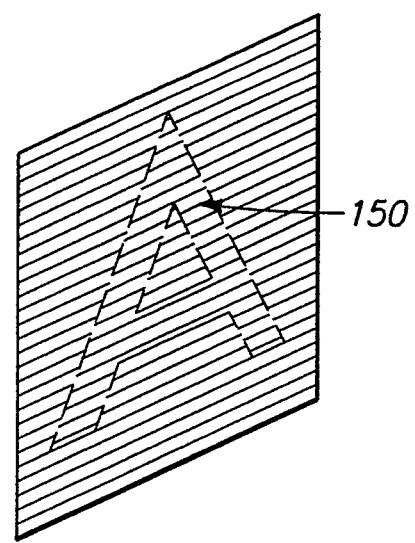
Fig 1B
PRIOR ART
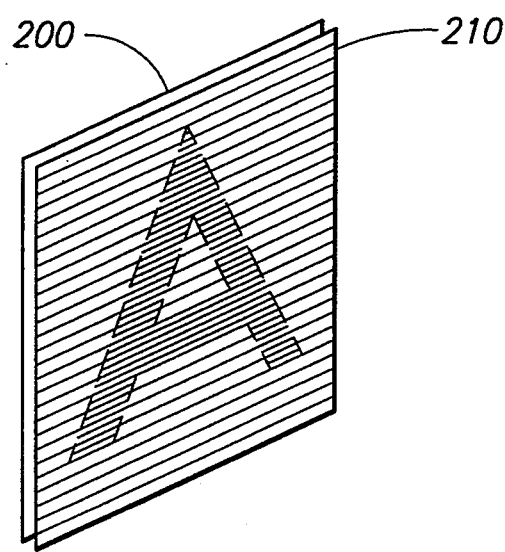
Fig 2
PRIOR ART
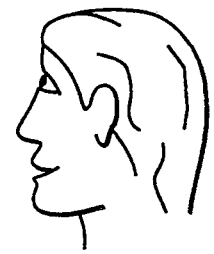

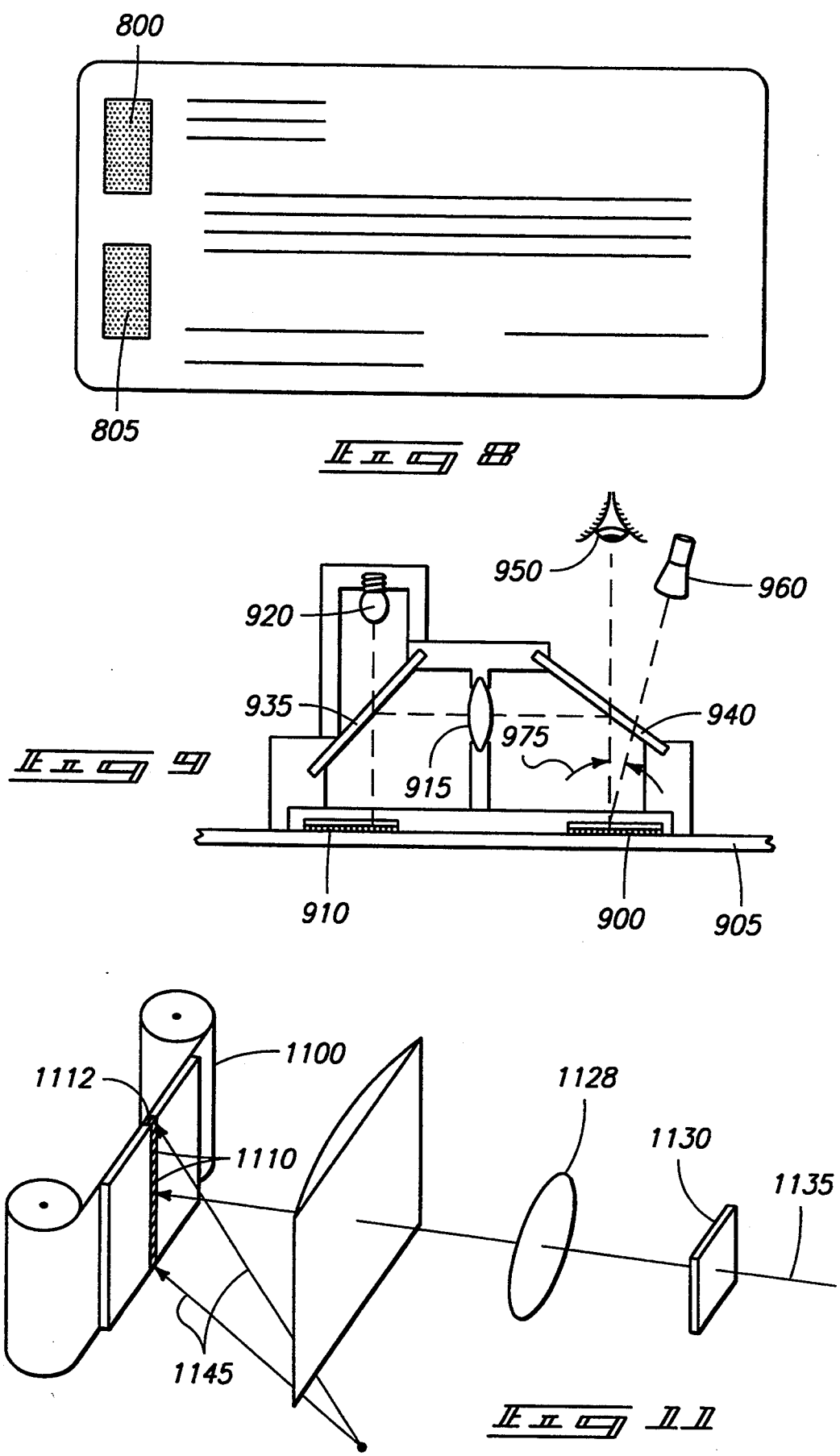

CHART OF STEPS IN BINARY ENCODING ALGORITHM

1. INPUT KERNEL INFORMATION

2. DETERMINE NUMERICAL VALUE OF KERNEL

3. INSERT NUMERICAL VALUE OF KERNEL INTO BINARY PSEUDORANDOM NUMBER GENERATOR Bk(X,Y)

4. PLACE A DOT ON THE PLANE (X,Y) AT LOCATIONS [(Xi+d),Yj] IF Bk(Xi,Yj)=0, OR AT LOCATION [(Xi,d),Yj] IF Bk(Xi,Yj)=1, WHERE d IS THE WIDTH OF A DOT AND THE WIDTH OF A DOT EQUALS ONE-HALF OF X(i-1) AND X(i).

FIG. 14

CHART OF STEPS IN GREY SCALE ENCODING ALGORITHM

1. DETERMINE THE INPUT IMAGE DENSITY D AT LOCATION (Xi,Yj), ON A SCALE FROM 0 TO 1

2. DETERMINE THE VALUE OF Bk(Xi,Yj)

4. PLACE A DOT ON THE PLANE (X,Y) AT LOCATION [(Xi+a),Yj] IF Bk(Xi,Yj)=1, OR AT LOCATION [(Xi-a),Yj] IF Bk(Xi,Yj)=0 IF Bk(Xi,Yj)=1, WHERE A=D*d.

FIG. 15

ANTICOUNTERFEITING METHOD AND DEVICE UTILIZING HOLOGRAMS AND PSEUDORANDOM DOT PATTERNS

BACKGROUND

1. Field of the Invention

The present invention relates to anticounterfeiting security devices and methods employing holograms and/or encoded patterns of dots.

2. Description of Prior Art

It is well known that when a regular pattern of dots or lines is viewed through a transparent replica of that pattern, there is an interference between the pattern and the replica which results in Moire fringes. These fringes have a size and configuration that depends upon the spacing between the pattern and its replica, and the configuration of the dots and their arrangement in the pattern.

Methods for controlling Moire fringes to form detailed images are known in the prior art. Broken line patterns arranged to yield Moire fringes in the form of continuous-tone pictures, for the purpose of making anticounterfeiting devices have been described. In this prior art technique, a broken pattern of lines is viewed through a simple grating screen. The distorted pattern is a distortion of the grating screen, wherein the lines in the pattern are offset by an amount corresponding to the density of the picture which is to be encoded in the pattern. The use of such Moire fringes as a security device has been suggested in the prior art, but that approach has the fatal flaw of being too simple to simulate. Any skilled technician with darkroom experience and access to the standard tools of a graphics technician can counterfeit such patterns and decode messages encoded that way.

Methods have been described in the prior art for making holographic anticounterfeiting devices in the form of isolated dot holograms separated by materials with different chemical and physical characteristics, so that when the holograms are laminated into a sandwich construction or are overcoated, it is extremely difficult to remove the lamination or overcoating without destroying the dot holograms or their arrangement. While this is a useful technique to prevent direct copying of a security device, it is still somewhat subject to counterfeiting because it is not very difficult to reduce a hologram to dots if there is no need to be concerned with the precise locations of the dots.

Methods have also been described in the prior art for recording full-color holograms in the form of an array of dot holograms overlain with dot color filters. While such holograms are fairly difficult to manufacture, they have not been proposed for use as security devices and they do not per se have any covert features particularly useful for security devices.

No prior art method has suggested an anticounterfeiting or security system employing pseudorandom dot screens and/or pseudorandomly arranged dot holograms to encode messages for security purposes. Similarly, no prior art method has suggested an anticounterfeiting or security system employing modulated pseudorandom dot patterns to encode images.

BRIEF SUMMARY AND OBJECT AND ADVANTAGES OF THE INVENTION

The present invention relates to anticounterfeiting security devices and methods employing holograms and/or encoded patterns of dots.

It is known that a reference transparency in the form of a regular screen pattern such as a Ronchi grating can be used to decode a spatial message encoded in the form of displaced portions of an otherwise identical grating. If the screen pattern is sufficiently fine, both the regular screen and the encoded spatial message appear to be continuous, featureless grey. However, when a transparency of the Ronchi grating is placed over the encoded message, the message becomes immediately visible. The reason for this is that, if the Ronchi grating is in precise register with the unmodulated (displaced) portion of the message pattern, the opaque parts of the screen directly overlay the opaque parts of the unmodulated parts of the message screen, yielding an unaltered uniform grey background; while in the modulated parts of the message the opaque parts of the screen overlay the transparent parts of the message screen, yielding a uniform black portion. Offsetting the message screen by varying amounts in the modulated parts of the message yields a variable grey scale.

It is an unexpected fact, however, that a completely random reference screen of dots may be substituted for the Ronchi grating. In this case, the average distribution of the dots should still be such that approximately 50% of the screen is opaque. The unmodulated portion of the message screen, then, may be simply the photographic reversal of the reference screen. When the reference screen is superimposed onto the message screen, every part of the combined screens appears black if there is no modulation of dot positions in the message screen. However, any modulation of dot positions in the message screen will allow light to pass through the combination of screens in an amount which depends on the amount of displacement of the dots.

In the present invention, a hologram is recorded as either a regular or irregular pattern of dots. For example, a standard rainbow hologram may be recorded through a contact dot screen which is in contact with the recording medium, thereby limiting exposure to selected dots. When the hologram is viewed through a second screen which is a duplicate of the contact screen except that some portions of the second screen are reversals of the contact screen, the reversed portions will show up as portions either lighter or darker than the surrounding areas, depending upon the exact positioning of the second screen relative to the hologram.

Alternatively, two dot patterns may be printed side-by-side on a document, and one of the patterns may be projected onto the other pattern by a suitable optical system. If one of the patterns is a modulated version of the other, the modulation will become easily apparent when one is projected onto the other.

The dots in the message pattern and the reference pattern may be pigment dots on an opaque surface and a transparent sheet respectively, or they may be small regions in which holographic or other diffractive patterns are recorded. The message pattern may be viewed through the reference pattern, the reference pattern may be viewed through the message pattern, or the reference pattern may be used to illuminate the message pattern or vice versa. Alternatively, the message pattern may be detected by a video camera and electronically decoded.

Some novel features of the present invention are the use of holograms in a screen pattern for generating Moire fringes, and the use of pseudorandom screen patterns for encoding and decoding images, and the use of dot screens to encode facsimile transmissions.

The present invention has a number of advantages over prior art anticounterfeiting systems:

One advantage is that the present invention allows an encoding algorithm for a security feature to depend on information present in or on the document being protected.

A further advantage is that the present invention employs pseudorandom dot or line screens rather than simple, regular dot or line screens, thereby making duplication of the screens much more difficult.

A further advantage is that the present invention employs holograms in combination with dot-screen encoding, thereby at least doubling the difficulty of counterfeiting.

A further advantage is that the present invention provides an optical variable security device that can be used either overtly or covertly.

A further advantage is that the present invention employs a highly complex encoding/decoding scheme while providing a simple mechanism for physical realization of the scheme.

A further advantage is that the present invention permits several levels of security in a single device.

Objects of the present invention include providing security against counterfeiting, providing an optically variable device suitable for improving the security of valuable documents, and providing an optical security device and system with both overt and covert features.

DESCRIPTION OF THE DRAWINGS

FIG. 1a illustrates a prior art "reference screen" in the form of a simple Ronchi grating, and FIG. 1b illustrates a "message screen" in which the message is encoded by offsetting the grating lines in a region 150 corresponding to the letter "A".

FIG. 2 illustrates "decoding" of a message screen by viewing the message screen 200 through the reference screen 210.

FIG. 7b illustrates the appearance of the hologram of FIG. 7a when viewed through the reference screen of FIG. 4a.

FIG. 8 illustrates a document bearing a reference dot pattern and a message dot pattern.

FIG. 9 illustrates a decoding device which projects a message dot pattern onto a reference dot pattern or vice versa.

FIG. 11 illustrates an apparatus for recording dot-encoded messages onto a photosensitive medium as holograms.

FIG. 14 is a chart of a procedure for forming a pseudorandom dot pattern for use as a reference pattern.

FIG. 15 is a chart of a procedure for encoding a grey scale image as a pattern of dots based on a pseudorandom reference pattern.

DETAILED DESCRIPTION OF THE INVENTION

The present invention provides an anticounterfeiting security device and system having a very large level of complexity and consequently a very large level of security, while providing inexpensive and relatively simple method for utilizing the device and system.

The invention employs two patterns of dots: a message pattern and a reference pattern. Both patterns appear at first glance to be featureless grey patterns. However, the message pattern contains modulations which encode a message. In a graphic artists' terms, the reference pattern is nominally a 50% dot screen and the message pattern is a modulated duplicate or modulated reverse-contrast duplicate of the reference pattern. When the message pattern is viewed through the reference pattern in correct register, the message is decoded by the reference pattern and becomes visible.

The well-known Moire fringe phenomonon is related to the phenomonon employed in the present invention. Moire fringes result from long-range correlations between two overlapping patterns. That is, when two regular screens are overlapped, the screen patterns will come into coincidence and go out of coincidence at regular intervals. In the case of random screens or random dot patterns, there is essentially no correlation between the arrangement of dots at one location and the arrangement of dots at another location, so even if two identical random screens are overlapped, fringes will appear only if they are in nearly perfect register.

The present invention encodes a message in a screen or dot pattern composed of hologram dots. Alternatively, the invention encodes a message in a pseudorandom screen with or without the use of hologram dots.

Figure 3:
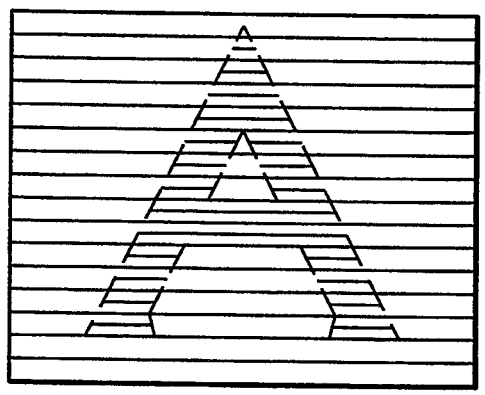
FIG. 3 shows the prior art appearance of a decoded message.
Figures 4A, 4B:
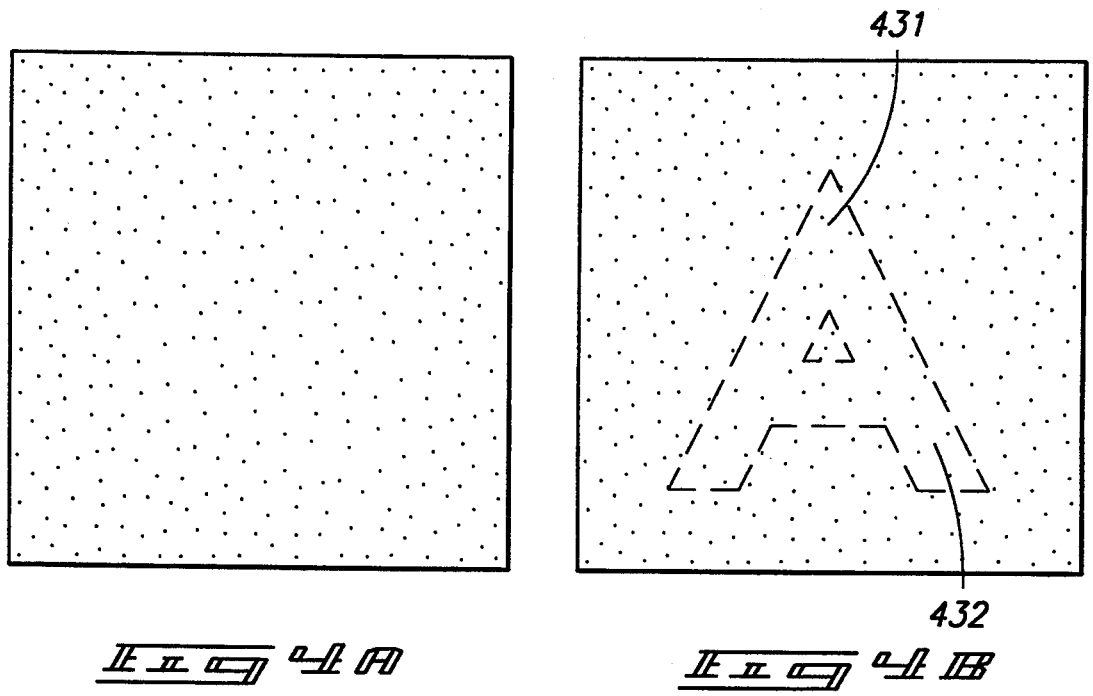
FIG. 4a illustrates a random dot pattern suitable for a reference screen.
FIG. 4b illustrates a message screen with the letter "A" encoded into it by reversing the contrast of the reference screen in the region of the letter "A".

FIG. 4a represents a pseudorandom dot screen used as a reference mask. FIG. 4b is a message mask, a modulated version of the reference mask in FIG. 4a, with the dots 431, 432 within the boundary of the letter "A" being offset a distance equal to the width of a dot. Preferably, the reference mask is transparent.

Figure 4C:
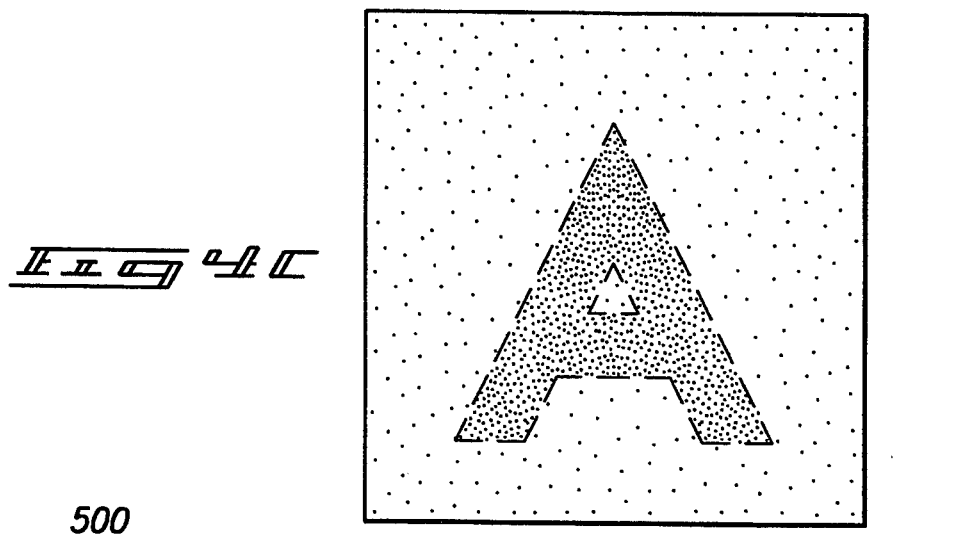
FIG. 4c shows the FIG. 4a mask on the FIG. 4b mask.

FIG. 4c illustrates what happens when the reference mask of FIG. 4a is placed on top of the message mask. The dots from both masks in the region outside the letter "A" are exactly superimposed, so the appearance of this region is essentially the same as the reference mask alone. The dots from the two masks inside the letter "A" do not overlap and they fill the region inside the letter "A" completely, so this region appears solid black. Thus, the reference mask decodes the message hidden in the message mask. Of course, it is important for the reference pattern and the message pattern to be accurately superimposed in this embodiment.

Figure 5:
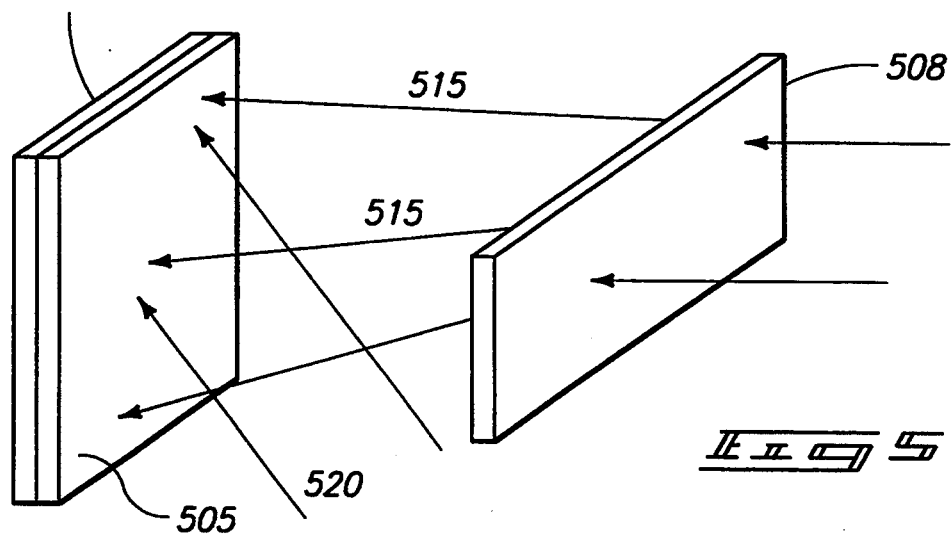
FIG. 5 illustrates a method for recording a hologram in the form of a pattern of selected dots, by using a dot mask in contact with the recording medium.

FIG. 5 illustrates one embodiment of an apparatus to record a message screen in the form of hologram dots. In this embodiment, a standard hologram 508 is illuminated to reconstruct an object beam 515 onto recording plate 500 through a contact mask 505. Contact mask 505 is a transparency of a dot pattern. Preferably the emulsion side of mask 505 is in contact with the recording surface of plate 500. A reference beam 520 interferes with the object beam 515 to form a hologram on plate 500, limited to selected dots by mask 505. Thus, in this embodiment, the message may be encoded into the dot pattern on mask 505 so that the pattern of dot holograms on plate 500 bears the same encoded message as well as the image of hologram 508.

Alternatively, a diffuser 508 may be used to generate an object beam devoid of any image, or the object beam may be provided by a projector system. Another variation on the process of FIG. 5 is to limit the exposure to specific regions on the recording medium, such as the region outside the letter "A". Then, a subsequent exposure using a different reference beam or different object beam is made in the region inside the letter "A". In this case, then, an image like the "2D3D" holograms of U.S. Pat. No. 4,629,282 may be built up. If the dot patterns are sufficiently fine, they will appear to the eye to be continuous, and it will not be easily noticed that the combined hologram is composed of dots.

It is worthy of note that it is truly impossible to decode a message encoded in the form of a random dot screen, without foreknowledge of the corresponding reference screen. This is proven by the fact that any message at all, existent or not, can be extracted from the message screen by a selected reference screen. For example, if the message screen in FIG. 4b is itself used as a reference screen to generate a second message screen bearing an encoded version of a five-pointed star, then the second message screen will, if used as a reference screen, "decode" the first message screen to reveal the five-pointed star. The only way to decode a message encoded according to the present invention is to know the algorithm by which the reference screen was generated. Indeed, it is possible to generate the reference screen by a truly random process such as by timing decay events in a small sample of radioactive material, in which case not even a lucky guess would be helpful.

Of course, if a pseudorandom number generator such as a computer algorithm is used to generate the reference screen and encode the message, the security of the system can be breached if the algorithm is not kept secure or if the algorithm is ordinary, simple or obvious.

Figure 6:
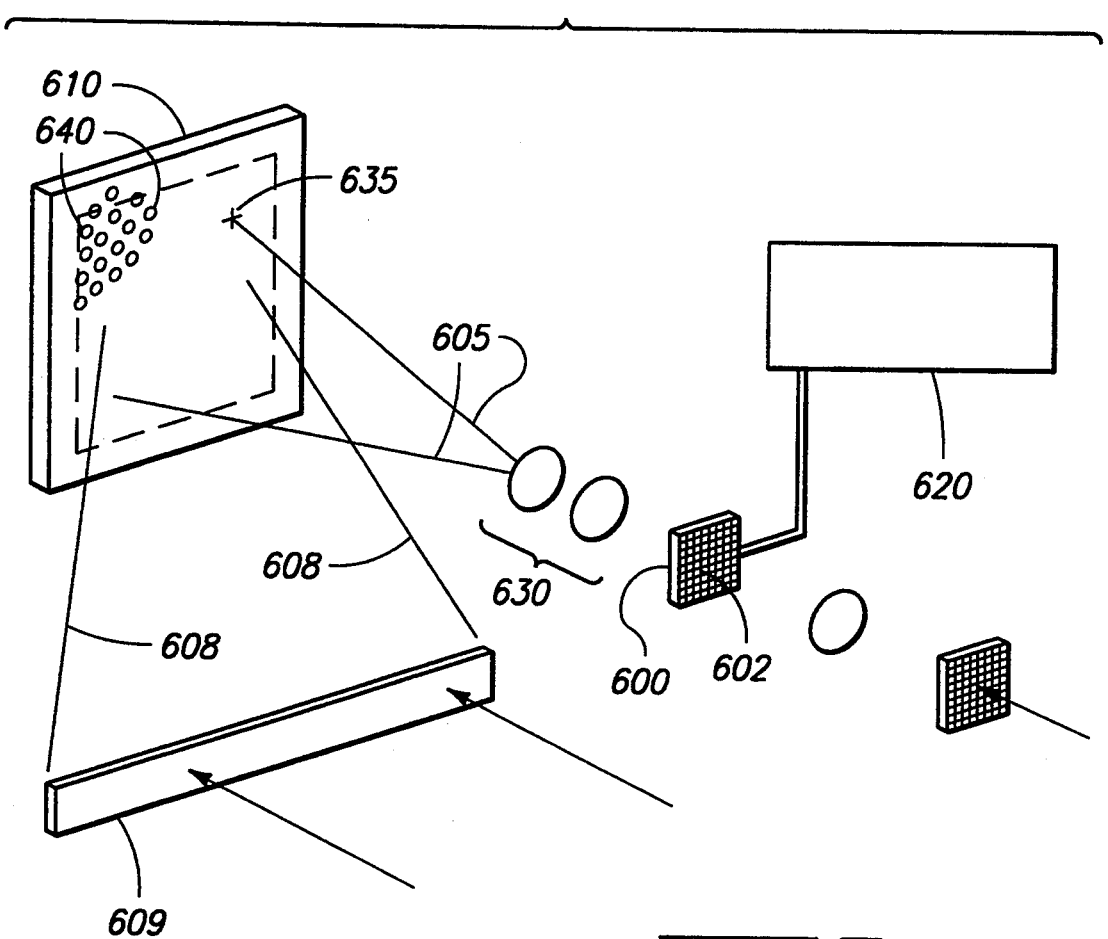
FIG. 6 illustrates another method for recording a hologram in the form of a pattern of selected dots, by projecting the object beam onto the recording plate through a dot mask or spatial filter located within the projection system.

A preferred embodiment of the invention is illustrated in FIG. 6. A programmable spatial filter 600, such as a liquid crystal TV screen, serves as a dot encoding mask through which an object beam 605 is projected onto a recording medium 610. The pattern of transparent and opaque dots 602 in the liquid crystal screen can be controlled by a computer 620. The projection system 630 is configured to focus an image 635 of the TV screen 600 onto the recording medium 610.

The hologram 610 made by the apparatus in FIG. 6 can have, by virtue of the programability of the TV screen 600, any desired arrangement of selected dots 640 exposed by the object beam 605. The computer 620 holds in its memory a definition of a reference screen (e.g., the one in FIG. 4a) and a definition of the message (e.g., the letter "A"), and controls the TV screen accordingly.

The object beam 605 interferes with a reference beam 608 on the recording medium 610, to form the hologram 610 as a pattern of selected dots 640 determined by the TV screen 600. In the illustration of FIG. 6, the reference beam 608 is diffused in one direction by diffuser 609 to increase the viewing angle of the hologram.

Figure 7A:
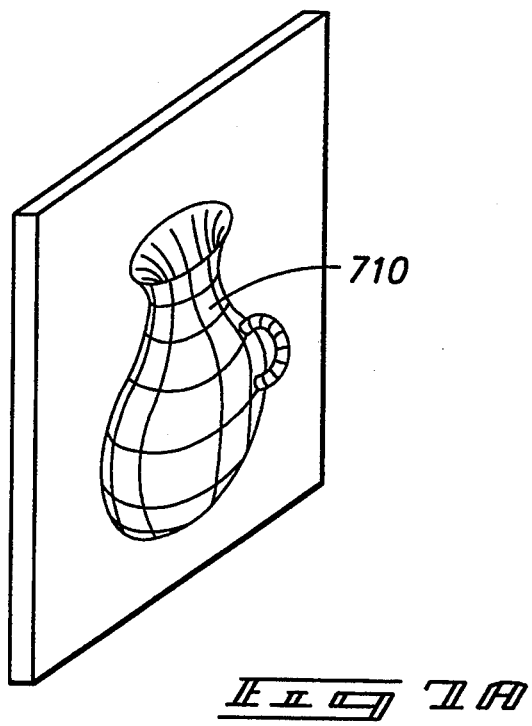
FIG. 7a illustrates the appearance of a hologram encoded according to the message screen of FIG. 4b.
Figure 7B:
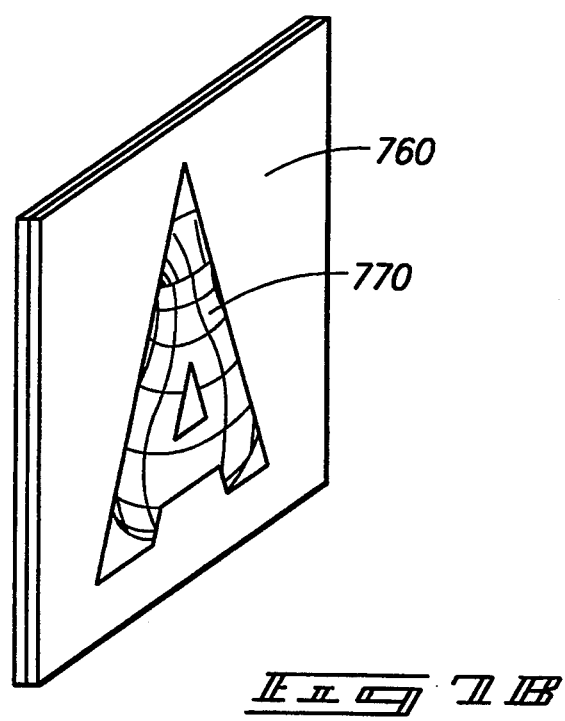

FIG. 7a represents a message screen embodiment in which the dot pattern is composed of hologram dots and the hologram dots contain a three dimensional holographic image 710. FIG. 7b represents the appearance of the message screen of FIG. 7a with a reference mask superimposed on it. In the areas 770 where the reference mask dots do not cover hologram dots, the hologram image is visible; while in the areas 760 where the reference mask dots cover the holograms dots the hologram is not visible. The message, then (the letter "A") is revealed in the form of the shape of the region 770.

A document such as a bank check is illustrated in FIG. 8, with two pseudorandom dot patterns 800 and 805. Pattern 800 serves as a reference mask to decode the message in pattern 805. Placing the two patterns in a predetermined relationship on the document facilitates accurate superposition of one pattern onto the other. The apparatus of FIG. 9 is a message decoding/reading device which makes use of the predetermined relationship of the two patterns 800 and 805. A light source 920 illuminates one of the patterns 910 on document 905 through a beamsplitter 935. Light reflected by pattern 910 is imaged by means of lens system 915 and beamsplitter 940 onto pattern 900. Where the reflective parts of pattern 910 are imaged onto reflective parts of pattern 900, light is reflected back through beamsplitter 940. Where the reflective parts of pattern 910 are imaged onto non-reflective parts of pattern 900, light is not reflected back through the beamsplitter 940 from pattern 900. Consequently, the message encoded in pattern 900 is decoded by pattern 910 without need for physical superposition of pattern 910 onto pattern 900. Either a photodetector 960 or the human eye 950 can be used to detect the decoded message.

If pattern 900 is a dot hologram pattern, the message will ordinarily be detected at some angle 975, but if it is simply a pattern of metallic dots or black dots on a white background, the message will be detected at the position of eye 950.

Figure 10:
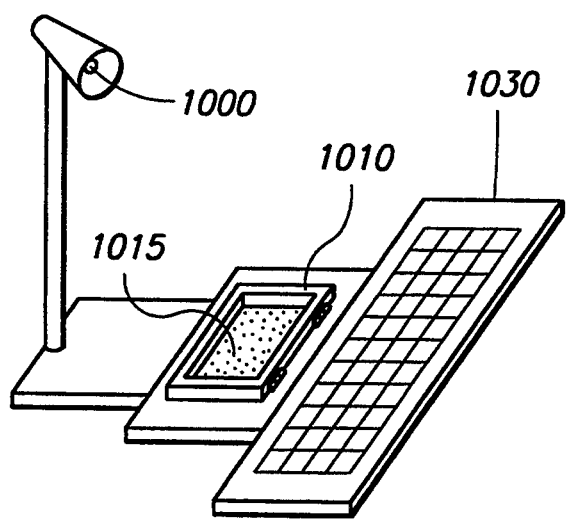
FIG. 10 illustrates a decoding device for dot-encoded holograms.

The decoding device shown in FIG. 10 is a light source 1000 and a reference mask 1010 allowing insertion of a hologram 1015 under the reference mask. The light from point source 1000 illuminates the hologram 1015 through the mask 1010, reconstructing those parts of the hologram which are not obscured by opaque parts of the mask. A keyboard and computer 1030 may be used to input information such as an identifying number or name. The mask 1010 may be a programmable spatial filter such as a liquid crystal TV screen.

The reference mask 1010 should be a liquid crystal TV screen or other programmable spatial filter if the reference mask is unique to the particular document being validated. For example, if the document is an identification card, an algorithm may be designed to generate a pseudorandom number sequence from the name on the card, and the number sequence can in turn determing the distribution of opaque and transparent dots on the reference mask. The message can be a symbol, a number, an image or the like; for example the message can be an image of the person identified by the card. In that case, the dot pattern on the encoding mask 1010 is configured according to a video image of the person to whom the card is issued, encoded according to the reference mask which itself is generated from the person's name.

FIG. 11 illustrates another preferred embodiment of an apparatus to record dot holograms onto a recording medium 1100. A liquid crystal TV screen 1130 or other spatial light modulator 1130 is illuminated with coherent light 1135. Projector system 1128 projects an image of the pattern on screen 1130 through cylindrical lens 1120, converging the image through aperture 1112 which may contain another spatial light modulator 1110. A reference beam 1145 impinges on aperture 1112, forming an interference pattern in conjunction with object beam 1125. Thus, a hologram of the image on screen 1130 is recorded on medium 1100 through aperture 1112. The recording medium 1100 may then be advanced, the patterns on modulator 1110 and screen 1130 may be changed, and another hologram recorded. By making a large number of such holograms, a large image may be constructed, having any desired three dimensional characteristics. The spatial modulator 1110 or the screen 1130 may be used to impose any desired dot pattern onto the holograms and the large image.

Alternatively, the modulator 1110 may be disposed of and the modulator 1130 may be used to accomplish both image projection and dot-encoding. Even if reference beam 1145 impinges on a particular portion of the medium 1100, no hologram will be recorded at that portion if no light passing through modulator 1130 reaches that portion of the medium 1100.

Figure 12:
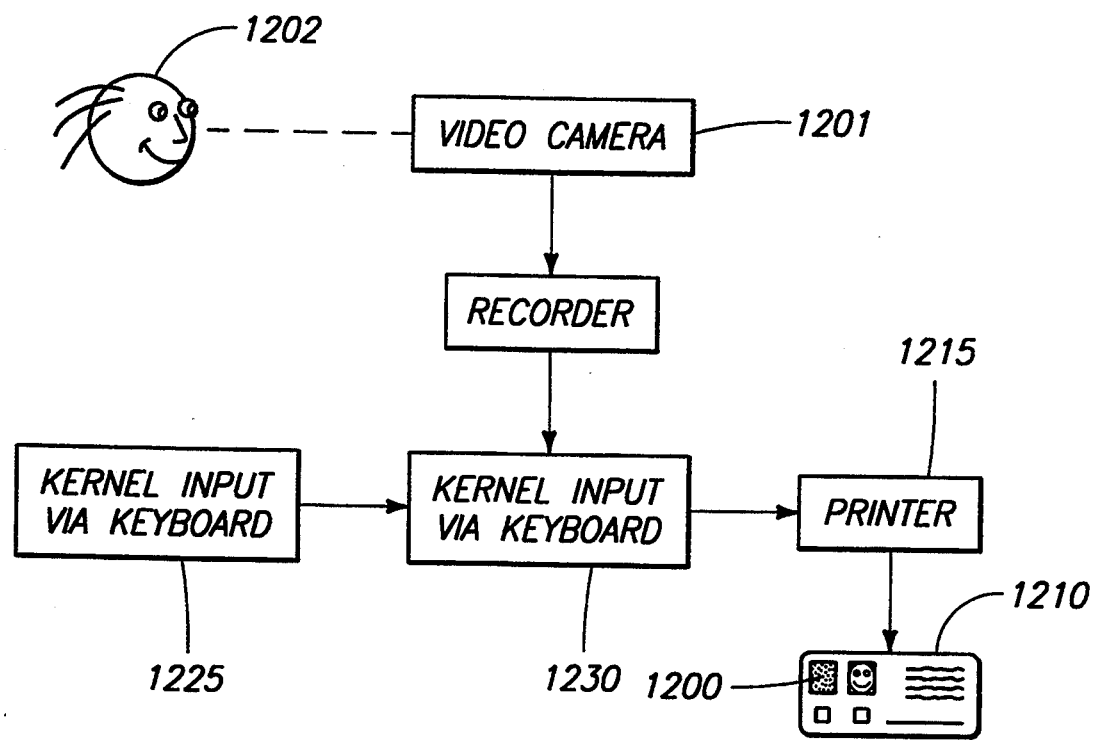
FIG. 12 is a block diagram of a system for making secure ID cards.
Figure 13:
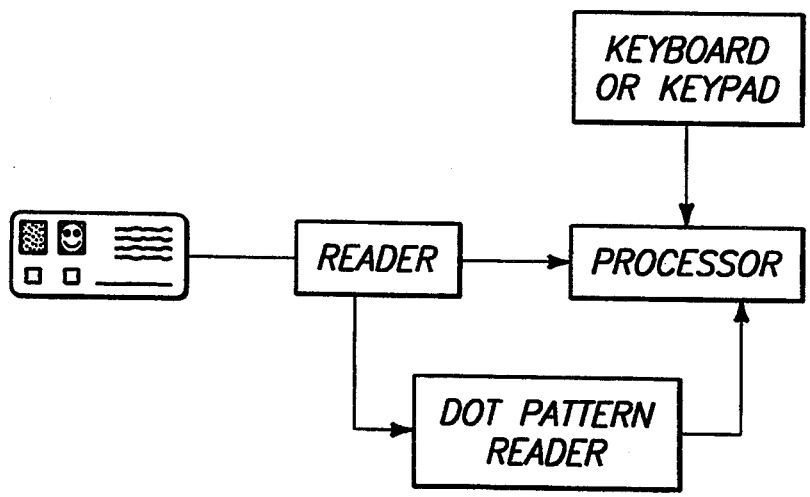
FIG. 13 is a diagram of a system for automatic verification of documents such as checks or stock certificates bearing dot-encoded holograms or printed dot patterns.

FIG. 12 is a block diagram of the process by which an image of a person's face may be encoded into a message dot pattern 1200 on an identification card 1210. A video camera 1201 or other camera records an image 1205 of the subject's face 1202.

A kernel is input via a keyboard 1225 into an encoder/computer 1230. A kernel is a small parcel of information (e.g., a 10-digit number) which controls a pseudorandom-number generator. The kernel can be, for example, the subject's name which the encoder/computer converts to a numerical value by assigning a value to each letter of the alphabet. A pseudorandom-number generator is an algorithm which calculates a second number when given a first number, in such a way that it is extremely difficult to predict the second number from the first number without knowledge of the algorithm. Equivalently, a pseudorandom-number generator is an algorithm which calculates a sequence of numbers such that it is extremely difficult to predict the next number from the preceding numbers in the sequence. An example of a pseudorandom-number generator is an algorithm to calculate the $(N \times M)$th decimal in the value of pi as a function of N. M serves as a kernel.

In the present invention it is preferable to use a pseudorandom number generator which calculates a single second number from a pair (x,y) of first numbers corresponding to the x and y coordinates of an image point or pixel. For example, a suitable function to use as a pseudorandom number generator is F(x,y), where:

| | F(x,y) = | 1 if G(x,y) has the value 1,2,3,4 or 5, |
| | | 0 if G(x,y) has the value 6,7,8,9 or 0, |
| and | G(x,y)= | the 27th decimal of the value of [(pi times x) − y]. |

The encoder/computer 1230 assigns a pseudorandom binary value (1 or 0) to every pixel in the image recorded by the video camera 1201 and thereby simulates a reference mask. The grey scale value of each pixel in the image is calculated and the position of a dot corresponding to each pixel is then determined such that the dot is displaced from its position in the reference mask by an amount corresponding to the grey scale value of the pixel. Maximum displacement is equal to half the distance between dots.

The printer 1215 is instructed by the encoder/computer to print a dot for every pixel in the location corresponding to the pixel location, the binary pseudorandom number corresponding to the pixel location, and the grey scale value of the pixel. The resulting document 1210 contains a dot pattern 1200 which, because of the random nature of the process that produced it, appears to be essentially a uniform grey pattern. However, when a reference mask is placed over the dot pattern 1200, the subject's face appears. A store clerk or guard can then directly compare the subject's face, photograph 1205, and face as decoded from the dot pattern.

Alternatively, a telefacsimile machine can encode its transmission by the method taught herein, so that the receiving machine prints out an encoded version of a document. A person at the receiving end may then superimpose a reference mask over the received document to decode the document. In order to optimize accuracy of the reference mask, the reference mask may itself be transmitted by one facsimile machine and printed out by the other.

If the reference mask is always the same, regardless of the information recorded in the message and on the document, there is a significant level of security against counterfeiting. However, if the reference mask depends in a covert way upon a kernel which is the information in the message or on the document, or upon a number memorized by the person to whom the card is assigned, the security level can be extremely high if the algorithm for generating the reference mask is kept secure.

Message screens can be read and decoded automatically by an optoelectronic system which records the screen in sufficient detail to resolve the dots then compares the dots with a computed or stored simulation of the reference mask, point-by-point. Thus, it is not necessary to have an actual reference mask for direct optical comparison.

If a message screen is formed from hologram dots, where the hologram is a reflective Bragg hologram designed to reflect only light of a particular color (say, green), incident perpendicular to the surface, then by placing a color filter over the image sensor at position 950, the decoder/viewer will be suitable for detecting both holographic dot-encoded messages and simple printed dot-encoded messages.

Messages can be encoded in the form of color dots as well as black dots, so that decoding results in a visible color message. For example, the television screen in FIG. 11 or FIG. 6 can be a color TV screen and the recording medium can be a color film or panchromatic Bragg medium.

An alternative way to produce the dot hologram is by using a continuous hologram in the form of hot stamping foil, but to hot stamp the hologram in a pattern of dots onto a document. Yet another way is to selectively demetallize a metallized embossed hologram, so that only selected dots remain metallized. Yet another way is to selectively destroy or obscure a continuous hologram so that only selected dots remain. The result of any such method is the same: a hologram ends up in the form of a pattern of selected dot holograms which may appear continuous when viewed from a distance.

An experimental demonstration of the invention was made as follows:

A company logo image in several colors was color-separated to form a single transparency for each color. Each transparency was then contact-printed through a halftone screen, with different dot spacing for each color, onto high-contrast photographic plates. The photographic plates were used as masks for making a 2D hologram, approximately as indicated in FIG. 5. The resulting hologram looked like an ordinary 2D hologram. However, when a halftone screen with a dot spacing intermediate between the spacings of the various screens in the color- separated masks was placed on top of the hologram as a reference mask, the different-colored areas of the hologram were clearly seen to have encoded within them patterns of large dots, the dots having different sizes in the different regions of the image.

An additional level of security may be added by making use of the fact that the reference screen, which serves as the basis of the encoding scheme for making the message screen, is itself quite arbitrary. Any screen will serve as a reference screen as long as it is roughly 50% black and 50% transparent (or 50:50 reflective and transparent, etc.) in any reasonably small region encompassing one to two dozen dots. Therefore, the reference screen can itself carry a message that can be decoded by a third screen.

Figure 16:
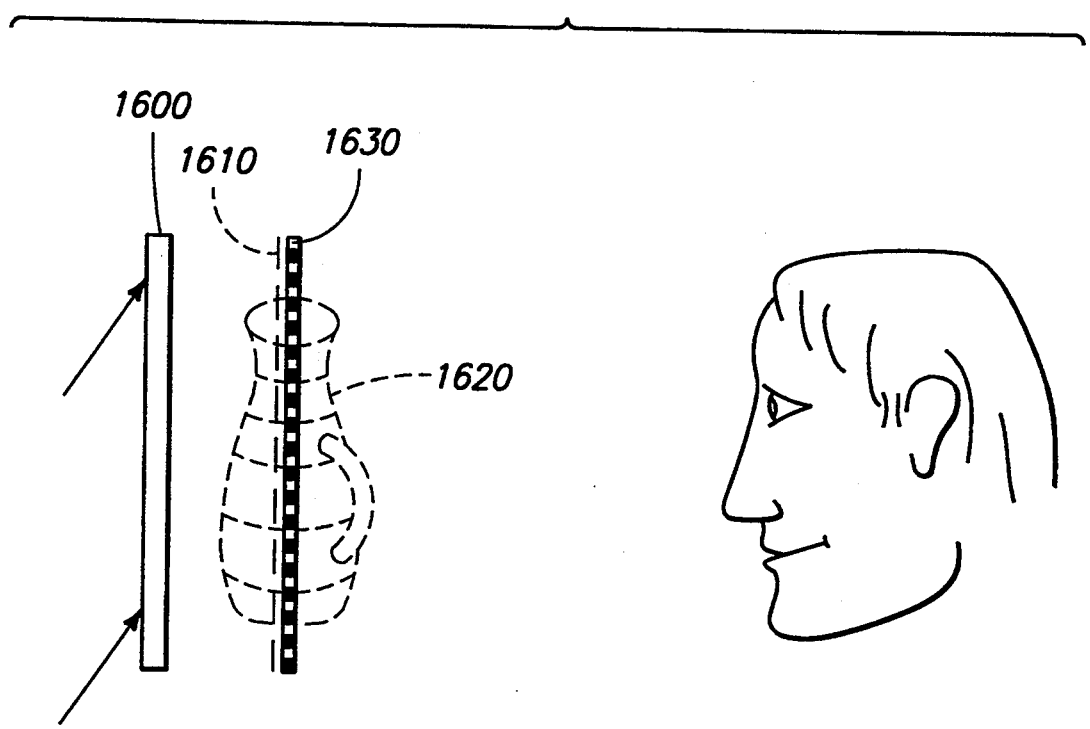
FIG. 16 is an illustration of the operation of a hologram which projects a dot screen pattern onto a reference mask while also reconstructing an image.

Another embodiment of the invention is illustrated in FIG. 16. In this embodiment, a hologram 1600 bears a message screen in the form of a real image of a dot pattern 1610 reconstructed when hologram 1600 is illuminated from behind. For decoding, a reference mask 1630 consisting of transparent and opaque dots is placed in the plane where the dot pattern 1610 is reconstructed. The hologram 1600 may contain a two dimensional or three dimensional image 1620. If the hologram 1600 is viewed through the reference mask 1630, the three dimensional image is viewable in those regions where the transparent portions of the reference mask 1630 are coincident with the dots in pattern 1610.

Figure 17A:
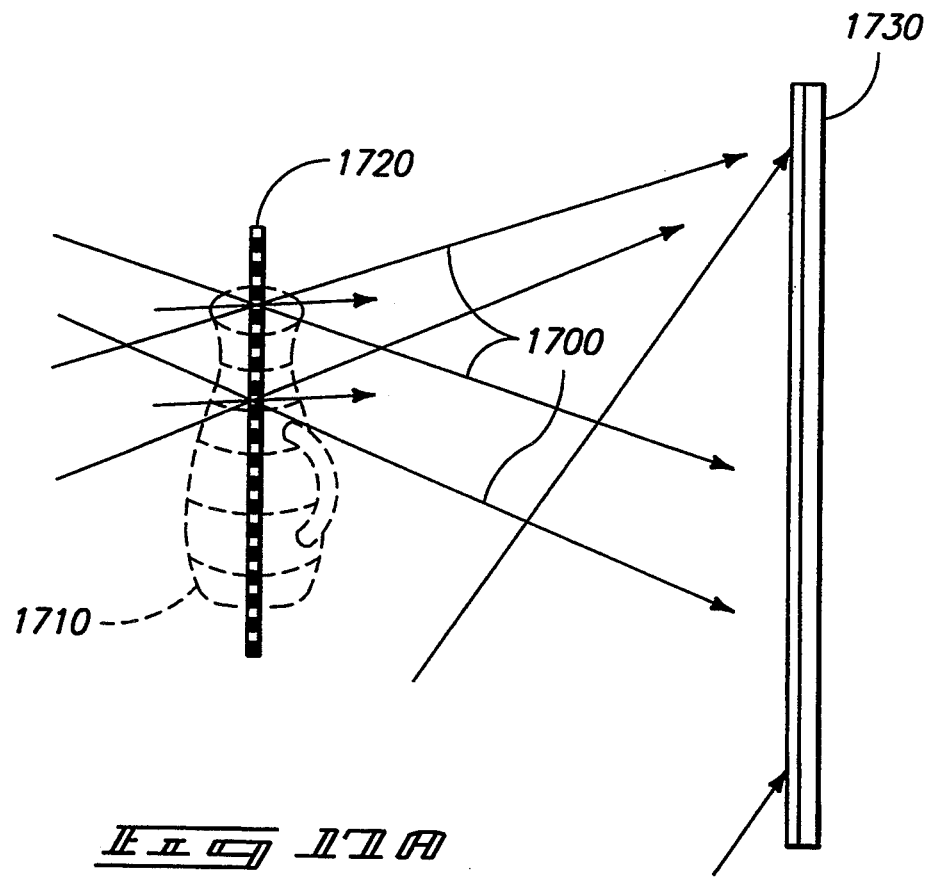
FIG. 17a is an illustration of a first step in making a hologram which projects a dot screen pattern onto a reference mask while also reconstructing an image.
Figure 17B:
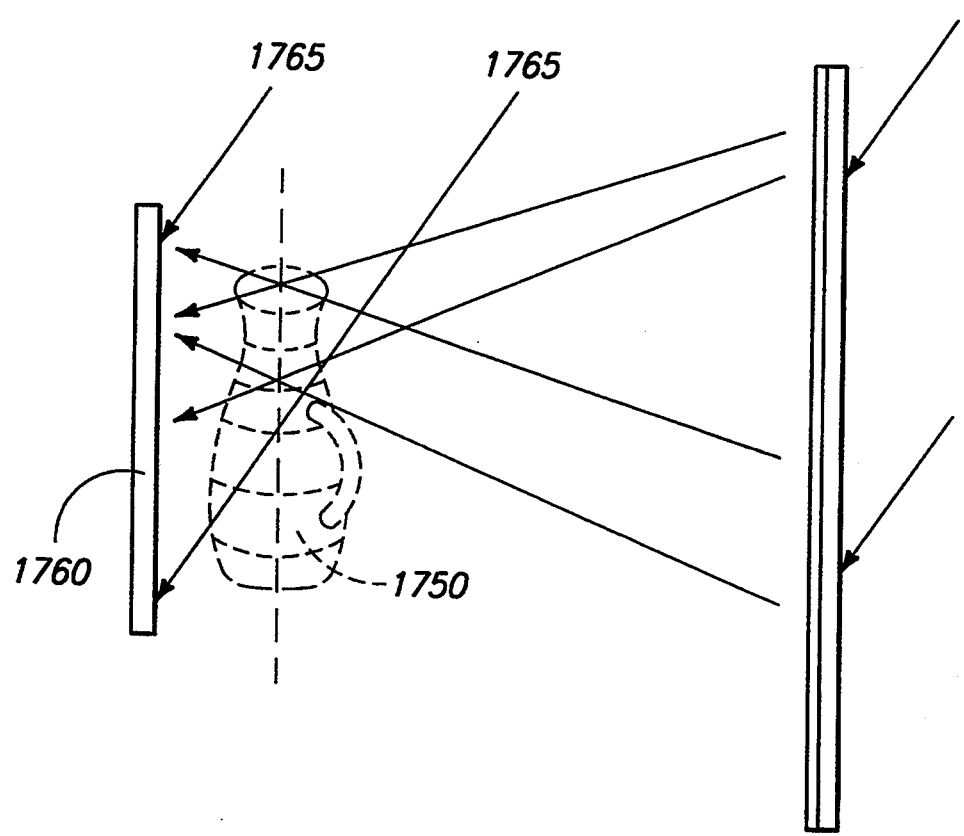
FIG. 17b is an illustration of a second step in making a hologram which projects a dot screen pattern onto a reference mask while also reconstructing an image.

FIGS. 17a and 17b illustrate one method for making the hologram 1600 of FIG. 16. An object beam 1700 bearing an image 1710 is passed through a dot mask 1720, and a hologram 1730 of object beam 1700 is recorded downstream. The hologram 1730 is then illuminated as in FIG. 17b to form a reconstructed image 1750 on plate 1760. A reference beam 1765 is supplied so that a transmission hologram of image 1750 is recorded on plate 1760. Hologram 1760 then serves as hologram 1600.

In some embodiments of the invention, the hologram may be artificially formed, such as by scribing or by drawing and photographic reduction. The dots may be formed at any of several stages in the process, including the original image, filtration of an image, destruction or alteration of selected spots in a recorded image, or transfer of selected spots in an image to a surface. Hot stamping, printing, photographic recording, electronic image display, and other such graphic and display media can be used to create, record, or apply the dot patterns. The term "hologram" is intended to include diffraction gratings, classical holograms, transmission holograms, embossed holograms, Denisyuk holograms, photopolymer holograms, silver halide holograms, and the like, whether generated optically, electronically, or mechanically.

The forms of the invention disclosed herein constitute preferred embodiments of the invention. Many other forms and embodiments are possible, and it is not possible nor intended herein to illustrate all of the possible equivalent forms, variations, and ramifications of the invention. It will be understood that the words used are words of description rather than limitation, and that various changes, such as in the detailed encoding scheme, in the materials from which the components are made, in the method of creating the dot patterns, in the method of detecting the decoded message, or in the configurations and structures of the encoding apparatus or the decoding apparatus, may be made without departing from the spirit or scope of the invention herein disclosed.

For convenience, the term "pattern of dots" has been used, but it will be readily understood by persons skilled in the art that in fact any screen-type pattern may be used, such as a pattern of lines, line segments, very small symbols, squares, and so on. In the following claims, "pattern of dots" and like terms are to be construed in this broad sense. It must be noted that every possible pattern can be reduced to a pattern of dots, with the provision that the dots are permitted to be contiguous.

The term "document" is used in the specification and claims hereof to broadly mean such items as credit cards, bank checks, paper or plastic documents, identification badges, security tapes, tickets, passes, certificates, photographs, passports, copyrighted materials, books, magazines, packaging, wrapping paper, and printed materials bearing information or having any kind of value.

The term "security device" is used in the specification and claims hereof to broadly mean any device such as a printed pattern, a hologram, label, card, badge, or the like which can be used to confirm the validity of a document or the identity of a person or object, or the legitimacy of source of manufacture of an object or the like, or which may be used to conceal information from certain persons.

I claim:

1. An anticounterfeiting security method comprising:
    means for extracting information from a document to use as a kernel for generating a pseudorandom reference dot pattern,
    means for generating a pseudorandom reference dot pattern from said kernel,
    means for modulating said reference dot pattern as an encrypted message dot pattern to encrypt a message and means for applying said message dot pattern to said document in an optically detectable form.

2. The method of claim 1, further comprising means for reading said message dot pattern and means for comparing said message dot pattern to said reference dot pattern, thereby decoding said message.

3. The method of claim 2, said comparing being accomplished by illuminating said message pattern with light corresponding to said reference pattern.

* * * * *